United States Patent [19]

Lange et al.

[11] Patent Number: 4,749,498

[45] Date of Patent: Jun. 7, 1988

[54] WATER-SOLUBLE POLYMERS AND THEIR USE AS FLUSHING LIQUID ADDITIVES FOR DRILLING

[75] Inventors: Werner Lange, Visselhoevede; Branislav Böhmer, Walsrode, both of Fed. Rep. of Germany

[73] Assignee: Wolff Walsrode Aktiengesellschaft, Walsrode, Fed. Rep. of Germany

[21] Appl. No.: 886,282

[22] Filed: Jul. 14, 1986

Related U.S. Application Data

[63] Continuation-in-part of Ser. No. 694,718, Jan. 25, 1985, abandoned.

[30] Foreign Application Priority Data

Feb. 9, 1984 [DE] Fed. Rep. of Germany ....... 3404491
Jan. 23, 1985 [NO] Norway ................................. 850283
Jan. 28, 1985 [EP] European Pat. Off. ......... 85100844.1
Feb. 5, 1985 [JP] Japan ................................. 60-19374

[51] Int. Cl.$^4$ .............................................. C09K 7/02
[52] U.S. Cl. ................................ 252/8.514; 252/8.51; 526/264; 526/288
[58] Field of Search .................... 526/264, 287, 288; 252/8.514

[56] References Cited

U.S. PATENT DOCUMENTS

| | | | |
|---|---|---|---|
| 3,892,720 | 7/1975 | Jahnke | 524/264 |
| 3,929,741 | 12/1975 | Laskey | 521/38 |
| 4,048,077 | 9/1977 | Engelhardt et al. | 252/8.5 C |
| 4,309,523 | 1/1982 | Engelhardt et al. | 526/240 |
| 4,357,245 | 11/1982 | Engelhardt et al. | 252/8.5 |
| 4,451,631 | 5/1982 | Engelhardt et al. | 526/287 |
| 4,471,097 | 9/1984 | Uhl | 526/240 |
| 4,521,579 | 6/1985 | Engelhardt et al. | 526/287 |
| 4,544,722 | 10/1985 | Giddings et al. | 524/264 |
| 4,608,182 | 8/1986 | Dickert | 252/8.514 |
| 4,609,476 | 9/1986 | Heilweil | 252/8.514 |
| 4,619,773 | 10/1986 | Heilweil | 252/8.514 |

FOREIGN PATENT DOCUMENTS 910136 11/1962 United Kingdom .

Primary Examiner—C. Warren Ivy

Attorney, Agent, or Firm—Sprung Horn Kramer & Woods

[57] ABSTRACT

Water-soluble polymers consisting of from 40 to 80 mole percent of residues corresponding to the following formula (I)

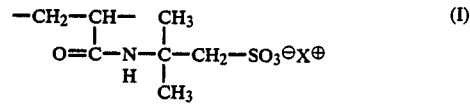

in which $X^\oplus$ is a cation or $H^\oplus$, from 10 to 30 mole percent of residues corresponding to the following formula (II)

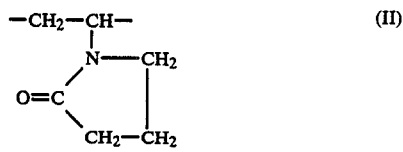

from 0 to 30 mole percent of residues corresponding to the following formula (III)

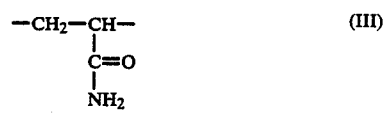

and from 0 to 10 mole percent of residues corresponding to the following formula (IV)

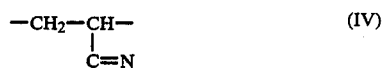

residues I to IV being statistically distributed in the polymer and the sum of the mole % of I–IV always having to amount to 100.

12 Claims, No Drawings

WATER-SOLUBLE POLYMERS AND THEIR USE AS FLUSHING LIQUID ADDITIVES FOR DRILLING

This is a continuation-in-part of may application Ser. No. 694,718, filed Jan. 25, 1985, now abandoned.

This invention relates to new water-soluble copolymers consisting of 4 to 80 mole percent of residues corresponding to the following formula (I):

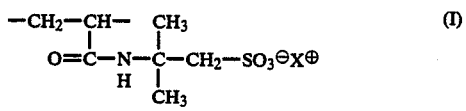

with X⊕ representing H⊕ or a cation from 10 to 30 mole percent of residues corresponding to the following formula (II):

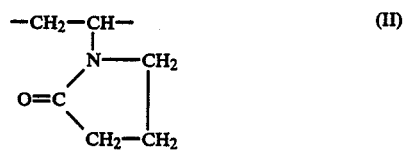

from 0 to 30 mole percent of residues corresponding to the following formula (III):

and from 0 to 15 mole percent of residues corresponding to the following formula (IV):

and to their use as additives in flushing liquids for drilling, particularly those which are used at high temperatures and high salt concentrations.

The production of water-soluble polymers containing sulfonic acid groups incorporated in the polymer chains has already been described in detail in numerous patent specifications and in the specialist literature. For example, the synthesis of copolymers of vinyl sulfonic acid with acrylamide and vinyl pyrrolidone is described in Journal of Polymer Science, 38, 147 (1969).

German Pat. No. 1 101 760 describes a process for the production of water-soluble copolymers of vinyl sulfonic acid and acrylonitrile, optionally in admixture with other olefinically unsaturated compounds. DAS No. 2444108 describes, for example, copolymers of vinyl and alkyl sulfonates with acrylamide or vinyl amides.

Water-soluble copolymers containing 2-acrylamido-2-methyl propane sulfonic acid (AMPS) as comonomer are described in U.S. Pat. Nos. 3,953,342 and 3,768,565, in DOS Nos. 25 02 012 and 25 47 773, in U.S. Pat. Nos. 3,907,927, 3,926,718 and 3,948,783. According to U.S. Pat. No. 3,929,741, water-insoluble copolymers can be produced from vinyl pyrrolidone and AMPS.

Water-soluble copolymers containing AMPS, vinyl-1-imidazole or vinyl-2-imidazole and, optionally, a number of other monomers as constituents are described in PCT Application WO No. 23/02449.

The polymers mentioned in this PCT application may be used as high-temperature-stable flushing additives for drilling which, although retaining their effectiveness when used at high electrolyte concentrations, lead to heavy losses of water during flushing.

However, the water losses during flushing are required to be minimal, even at high temperatures and at very high salt concentrations. The loss of water under pressure (so-called API-value) should amount to less than 10 ml.

It is surprisingly possible using the polymers according to the invention to provide high-temperature-stable protective colloids which provide for minimal losses of water under pressure (API value) even at high salt concentrations.

The outstanding effectiveness of the copolymers according to the invention as flushing additives for drilling was completely surprising because the copolymers which are described in DE-OS No. 30 27 422 and which consist of the same monomers give entirely unsatisfactory results when used at high temperatures.

Accordingly, the present invention provides water-soluble polymers consisting of from 40 to 80 mole percent of residues corresponding to the following formula (I):

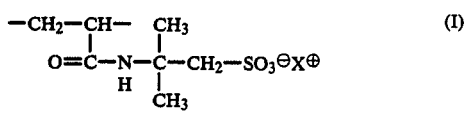

in which X⊕ is H⊕ or a cation, preferably an alkaline metal ion as such Na⊕, from 10 to 30 mole percent of residues corresponding to the following formula (II):

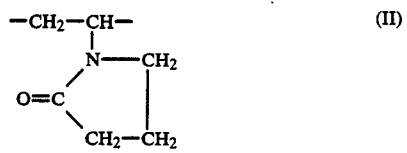

from 0 to 30 mole percent of residues corresponding to the following formula (III):

and from 0 to 15 mole percent of residues corresponding to the following formula (IV):

the residues I to IV being statistically distributed in the polymer totalling 100 mole percent.

The present invention also provides the use of the polymers according to the invention as protective colloids in flushing liquids for drilling.

Preferred copolymers according to the invention consist of from 50 to 70 mole percent of residues corresponding to formula I; from 15 to 30 mole percent of residues corresonding to formula II; from 10 to 30 mole percent of residues corresponding to formula III, and from 5 to 10 mole percent of residues corresponding to formula IV.

The polymers according to the invention may be produced in conventional manner, for example by radical polymerization in aqueous solution.

The polymerization reaction is carried out in the usual way in an inert gas atmosphere, preferably nitrogen. The polymerization temperature should be in the range from 20° to 100° C. and preferably in the range from 30° to 60° C.

Polymerization may be initiated by standard polymerization initiators, for example, $K_2S_2O_8$, $H_2O_2$, $(NH_4)_2S_2O_8$ and a mixture of $H_2O_2$ and isoascorbic acid. The polymerization initiator is generally used in a quantity of from 0.05 to 1 g per 100 g of total monomer.

To carry out polymerization, the monomers are dissolved in water in a concentration of from 20 to 30% by weight, based on the total monomer content, and the reaction is initiated after purging with nitrogen. The copolymer according to the invention is isolated from the aqueous solution by distilling off the water or by precipitation by means of a water miscible organic solvent, such as methanol, ethanol, acetone or the like. However, the aqueous solution containing the reaction product is directly used, optionally after the adjustment of a desired concentration as a protective colloid in flushing liquids for drilling.

The copolymers according to the invention are eminently suitable for use as auxiliaries for flushing liquids. They show a very good protective colloid effect both at high temperatures and at high electrolyte concentrations. Accordingly, the invention provides an outstanding protective colloid for use in high-temperature-stable drilling flushing liquids of high salt content.

The copolymers according to the invention are normally used in concentrations of from 0.5 to 40 kg/m$^3$ and preferably in concentrations of from 3 to 30 kg/m$^3$ for formulating the aqueous flushing liquids. Bentonites are generally added to the aqueous flushing liquids to increase viscosity and to seal off formations which have already been drilled whilst heavy spar, chalk and iron oxides are added to increase the density of the drilling slurry.

Bentonite, heavy spar, chalk and iron oxide may be added to the flushing liquids either individually or in various mixing ratios, depending on the formations to be drilled.

EXAMPLE 1

240 g of deionized water are introduced into a 1 liter polymerization flask equipped with a stirrer, reflux condenser and an inlet pipe for inert gas. 142.54 g of a 50% solution of 2-acrylamido-2-methyl propane sodium sulfonate (corresponding to 0.3442 mole of AMPS) are then added.

15.28 g of 1-vinyl-2-pyrrolidone, corresponding to 0.1377 mole, and 32.63 g of 30% acrylamide solution, corresponding to 0.1377 mole, are then added, followed by the addition of 3.66 g of acrylonitrile, corresponding to 0.0689 mole.

The quantities of monomers added correspond to a composition of 50 mole percent of AMPS, 20 mole percent of 1-vinyl-2-pyrrolidone, 20 mole percent of acrylamide and 10 mole percent of acrylonitrile.

After these additions, the mixture is stirred at a speed of 350 to 400 r.p.m. and purged with approximately 10 liters of nitrogen per hour to remove the oxygen from the solution. This purging with nitrogen is maintained throughout the reaction. The residual oxygen content at the beginning of polymerization is advantageously between 1.2 and 1.8 ppm. The pH-value of the reaction mixture is of the order of 8.5. The reaction mixture is heated to 33° C. After purging with nitrogen for about 10 minutes (approx 10 l/h), the polymerization reaction is initiated by the addition of 0.05% of $K_2S_2O_8$ (all the quantities of initiator indicated are based on the total monomer input). After about 1 hour, there is an increase in viscosity and, after 2 hours, 30 ml of deionized water are added for dilution. The reaction is completed by further additions of initiator after 4 hours (0.05% of $K_2S_2O_8$), 8 hours (0.15% of $K_2S_2O_8$), 10 hours (0.025% of $H_2O_2$ and 0.025% of isoascorbic acid) and 12 hours (0.025% of $H_2O_2$ and 0.025% of isoascorbic acid).

On completion of the reaction, 0.26 g of 25% sodium hydroxide and 17 ml of water are added. These additions increase the pH-value to 6.8.

The end product obtained is characterized by the following data:

| | |
|---|---|
| pH-value = | 6.8 |
| concentration = | 20.0% by weight |
| relative viscosity = (VT 24 Haake) | 30,000 mPa.s |
| intrinsic viscosity (IV) = | 4.00 g · dl$^{-1}$ |

Polymers 2 and 3, of which the compositions are shown in Table 1, may be produced in the same way as described in Example 1.

EXAMPLE 4

The apparatus described in Example 1 is used for polymerization. 230 g of deionized water are initially introduced into the polymerization flask, followed by the addition of 138.90 g of a 50% AMPS solution, corresponding to 0.3355 mole.

39.76 g of a 30% acrylamide solution, corresponding to 0.1678 mole, and 18.63 g of 1-vinyl-2-pyrrolidone, corresponding to 0.1678 mole, are then added.

These monomer inputs produce the following composition: 50 mole percent of AMPS, 25 mole percent of acrylamide, 25 mole percent of 1-vinyl-2-pyrrolidone.

0.004% of hydroquinone, based on the total monomer input, is added to regulate chain lengths.

The reaction mixture has a pH-value of the order of 8.5.

After these additions have been made, the solution is stirred at 350–400 r.p.m. and heated to 34° C. A stream of nitrogen (flow rate approx. 10 l/h) is then introduced into the reaction solution through the nitrogen inlet pipe. This purging with nitrogen is maintained throughout the reaction. The residual oxygen content of the solution at the beginning of polymerization advantageously amounts to between 1.2 and 1.8 ppm.

After purging with nitrogen for 10 minutes, the reaction is initiated by the addition of 0.05 g of $K_2S_2O_8$ (based on the monomer input). After about 2 hours, there is an increase in viscosity. The reaction is completed by further additions of initiator after 3 hours (0.05% of $K_2S_2O_8$), 6 hours (0.05% of $K_2S_2O_8$), 8 hours (0.15% of $K_2S_2O_8$), 10 hours (0.025% of $H_2O_2$ and 0.025% of isoascorbic acid) and 12 hours (0.025% of $H_2O_2$ and 0.025% of isoascorbic acid).

On completion of the reaction, 0.3 g of 25% sodium hydroxide and 52 ml of water are added.

The end product obtained is characterized by the following data:

| | |
|---|---|
| pH-value = | 7.2 |
| concentration = | 20.0% by weight |
| relative viscosity = (VT 24 Haake) | 9.000 mPa.s |
| intrinsic viscosity (IV) = | $3.07 \ g \cdot dl^{-1}$ |

Copolymers 5 to 18, of which the composition is shown in Table 1, may be similarly produced.

Polymers having different intrinsic viscosities (IV) are formed through changes in the pH-value and in the quantity of initiator used at the beginning of polymerization.

The abbreviations used in the Table have the following meanings:

AMPS = 2-acrylamido-2-methylpropane sulfonic acid
NCPy = 1-vinyl-2-pyrrolidone
AAm = acrylamide
AN = acrylonitrile
IV = intrinsic viscosity as measured on a 0.1-normal NaCl-solution at 25° C.

In the following application Examples, the polymers according to the invention are compared with known additives for flushing liquids.

The drilling slurries prepared by various protective colloids are judged by their filtrability in accordance with API Code 29. The quality of the drilling slurries and hence the effect of the protective colloids is judged on the basis of the water loss in the filtration test.

In this context, the water loss is understood to be the quantity of water which passes through a filter press defined in detail in the above specification in a certain time (30 mins) under a certain predetermined pressure (7 kg/cm²). The smaller the quantity of water passing through, the better the stability of the flushing operation. The tests are carried out at room temperature. Since measurement of the water loss in the 0-30 minute period did not give reproducible results, twice the quantity of water emerging from the flushing operation 7.5 to 30 minutes after application of the test pressure was quoted as the API water loss. These results are reproducible. In addition to the API test, greater importance has recently been attributed to the high pressure/high temperature (HP/HT) water loss because it is assumed that this value can better reproduce the actual conditions prevailing in the bore hole. To carry out this test, the flushing liquid which has been in use for 15 hours at 180° C. is heated to 150° C. in a test bomb. The filtration test is carried out at 150° C. under a pressure of 35 bars. By virtue of the better reproducibility explained in the foregoing, twice the quantity of water emerging from the flushing operation 7.5 to 30 minutes after application of the test pressure was quoted as the HT/HP water loss in the HT/HP test as well. This water loss should also be minimal. The following copolymers were used for the test:

A: Copolymer of 50 mole percent of AMPS, 20 mole percent of 1-vinyl-2-pyrrolidone, 20 mole percent of acrylamide and 10 mole percent of acrylonitrile (Example 1, Table I).

B: Copolymer of 50 mole percent of AMPS, 25 mole percent of 1-vinyl-2-pyrrolidone and 25 mole percent of acrylamide (Example 4, Table I).

C: Copolymer of 20.87 mole percent (=40% by weight) of AMPS, 22.40 mole percent (=22% by weight) of 1-vinyl-2-pyrrolidone and 57.73 mole percent (=38% by weight) of acrylamide (comparison product according DE-OS No. 30 47 422 Al).

Test Conditions

TABLE I[11]

| Example No. | Mole % AMPS | Mole % NVPy | Mole % AAm | Mole % AN | Hydroquinone addition %* | Starting pH-value | Viscosity Mpa.s | IV $gdl^{-1}$ |
|---|---|---|---|---|---|---|---|---|
| 1 | 50 | 20 | 20 | 10 | | 8.5 | 30,000 | 4.00 |
| 2 | 50 | 20 | 20 | 10 | | 7.0 | 12,000 | 3.40 |
| 3 | 50 | 20 | 20 | 10 | | 10.0 | 58.000 | 4.65 |
| 4 | 50 | 25 | 25 | | 0.004 | 8.5 | 9,000 | 3.07 |
| 5 | 50 | 25 | 25 | | 0.001 | 8.5 | 30,000 | 4.10 |
| 6 | 50 | 25 | 25 | | | 7.0 | 8,000 | 3.08 |
| 7 | 50 | 25 | 25 | | | 10.0 | 26,000 | 4.15 |
| 8 | 50 | 40 | 10 | | | 7.0 | 2,300 | 2.10 |
| 9 | 60 | 40 | | | | 7.0 | 4,600 | 2.50 |
| 10 | 50 | 40 | | 10 | | 7.1 | 2,600 | 3.05 |
| 11 | 50 | 50 | | | | 7.0 | 1,800 | 1.82 |
| 12 | 40 | 30 | 30 | | | 7.0 | 900 | 1.82 |
| 13 | 40 | 30 | 30 | | | 8.6 | 9,000 | 3.00 |
| 14 | 80 | 15 | 5 | | | 7.0 | 62,000 | 5.75 |
| 15 | 60 | 20 | 20 | | | 8.7 | 39,000 | 5.70 |
| 16 | 60 | 30 | 10 | | | 8.7 | 24,000 | 4.80 |
| 17 | 70 | 15 | 15 | | | 8.7 | 54,000 | 5.05 |
| 18 | 70 | 10 | 20 | | | 8.6 | 59,000 | 6.00 |

*This percentage is based on the monomer total used.

The following formulation for the flushing medium was used in all the Examples:

| | |
|---|---|
| 500 g of $H_2O$ | |
| 10 g of salt water drilling clay (SWDC), a product of Engelhard Minerals and Chemicals Division, MenloPark, New Jersey, 08817, USA = | 2% |
| 10 g of bentonite = | 2% |
| 50 g of chalk (Mikrosohl) = | 10% |
| 20 g of protective colloid, 100%, according to practical tests A-C = | 4% |
| 85 g of NaCl = | 17% |
| 7 g of KCl = | 1.4% |
| 50 g of $CaCl_2.H_2O$ = | 10% |
| 15 g of $MgCl_2.6H_2O$ = | 3% |
| 1.5 g of NaOH | |
| 0.5 g of a standard commercially available foam inhibitor, for example J 647 G, a product of Schill & Seilacher, Hamburg. | |

All percentages of the flushing media are based on the quantity of water.

The API water losses were measured at room temperature after storage for 15 hours at 180° C. In addition, the high temperature/high pressure (HT/HP) filtration test described above was carried out, the results are shown in Table II below:

TABLE II

| Protective colloid | API Water loss under normal conditions (7.5'-30') × 2 in ml | HT/HP Water loss | |
|---|---|---|---|
| | | After ageing for 15 h at 180° C. (7.5'-30') × 2 in ml | After ageing for 15 h at 180° C. (7.5'-30') × 2 in ml |
| A | 3.8 | 3.8 | 16 |
| B | 3.0 | 4.6 | 16 |
| C | 3.2 | 100 | total loss |

The results of the performance tests clearly demonstrate the considerable effectiveness of the additives A and B according to the invention by comparison with product C. The comparison product C completely fails after ageing at elevated temperature.

In the HT/HP-test, minimal water losses are achieved with products A and B according to the invention in this flushing medium of very high salt content (high percentage of divalent cation), whereas comparison product C suffers a total loss.

What is claimed is:

1. A water-soluble polymer comprising from 40 to 80 mole percent of residues corresponding to the following formula (I):

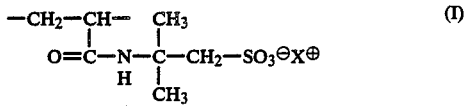

in which X⊕ is a cation or H⊕, from 10 to 30 mole percent of residues corresponding to the following formula (II):

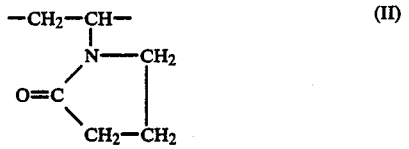

from 10 to 30 mole percent of residues corresponding to the following formula (III)

and from 5 to 10 mole percent of residues corresponding to the following formula (IV)

residues of formulas I to IV being statistically distributed in the polymer and the sum of the mole% of I-IV amounting to 100.

2. A water-soluble polymer according to claim 1 comprising of from 50 to 70 mole percent of residues corresponding to formula (I); from 15 to 30 mole percent of residues corresponding to formula (II); from 10 to 30 mole percent of residues corresponding to formula (II); from 10 to 30 mole percent of residues corresponding to formula (III) and from 5 to 10 mole percent of residues corresponding to formula (IV).

3. A water soluble polymer according to claim 1, wherein the cation of formula (I) is Na⁺.

4. A flushing liquid for drilling comprising as an additive a water-soluble polymer according to claim 1.

5. A flushing liquid as claimed in claim 4 containing from 0.5 to 40 kg/m³ of the polymer.

6. A flushing liquid as claimed in claim 4 containing additionally bentonites, heavy spar, chalk or iron oxides.

7. A water-soluble polymer according to claim 1, wherein the residue of formula I is 2-acrylamido-2-methyl-propane sulfonic acid.

8. A water-soluble polymer according to claim 1, wherein the residue of formula II is 1-vinyl-2-pyrrolidone.

9. A water-soluble polymer according to claim 1, wherein the residue of formula III is acrylamide.

10. A water-soluble polymer according to claim 1, wherein the residue of formula IV is acrylonitrile.

11. A water-soluble polymer according to claim 1, comprising 50 mole percent 2-acrylamido-2-methyl propane sulfonic acid, 20 mole percent 1-vinyl-2-pyrrolidone, 20 mole percent of acrylamide and 10 mole percent of acrylonitrile.

12. A water-soluble polymer according to claim 1, comprising 50 mole percent 2-acrylamido-2-methyl propane sulfonic acid, 25 mole percent acrylamide and 25 mole percent 1-vinyl-2-pyrrolidone.

* * * * *